(12) United States Patent
Cuylen

(10) Patent No.: US 7,064,552 B2
(45) Date of Patent: Jun. 20, 2006

(54) DEVICE FOR DETERMINING THE ENERGY STATE OF AN ENERGY STORING DEVICE OF A MOBILE DATA CARRIER

(75) Inventor: Michael Cuylen, Zirndorf (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/901,250

(22) Filed: Jul. 29, 2004

(65) Prior Publication Data

US 2005/0001609 A1    Jan. 6, 2005

Related U.S. Application Data

(63) Continuation of application No. PCT/EP03/12637, filed on Nov. 6, 2003.

(30) Foreign Application Priority Data

Dec. 18, 2002  (DE) ................ 102 59 384

(51) Int. Cl.
  *G01N 27/416* (2006.01)
  *H02J 7/16* (2006.01)
(52) U.S. Cl. ................ 324/428; 324/427; 320/149
(58) Field of Classification Search ............. 324/428, 324/114; 320/149, 151; 341/135
See application file for complete search history.

(56) References Cited

U.S. PATENT DOCUMENTS

| 4,866,389 | A |   | 9/1989 | Ryan et al. |
| 5,099,209 | A |   | 3/1992 | Seki et al. |
| 5,146,188 | A | * | 9/1992 | Suwada et al. ............. 331/111 |
| 5,796,703 | A | * | 8/1998 | Schell et al. ................ 369/116 |
| 6,343,051 | B1 | * | 1/2002 | Yabe et al. ................... 368/64 |
| 6,452,368 | B1 | * | 9/2002 | Basso et al. ................ 323/282 |
| 6,724,176 | B1 | * | 4/2004 | Wong et al. ................ 323/316 |
| 2004/0061672 | A1 | * | 4/2004 | Page et al. .................... 345/82 |

FOREIGN PATENT DOCUMENTS

| DE | 691 23 887 T2 | 1/1992 |
| DE | 100 54 970 A1 | 5/2002 |
| EP | 0 467 497 B1 | 1/1992 |

OTHER PUBLICATIONS

International Standard ISO/IEC FDIS 15693-2, Identification Cards-Contactless Integrated Circuit(s) Cards-Vicinity Cards-Part 2: Air Interface and Initialization, ISO/IEC 2000, pp. 1-13.

* cited by examiner

*Primary Examiner*—Adolf Deneke Berhane
*Assistant Examiner*—Aaron Piggush
(74) *Attorney, Agent, or Firm*—Sughrue Mion, PLLC

(57) ABSTRACT

A device (8) for determining the energy state of an energy storing device (7) of a data carrier (4) in which a voltage stabilizer (9) is used to derive a stabilized DC voltage for the supply of the data carrier from an unstabilized DC voltage available at the energy storing device. The device (8) has an evaluation circuit that includes an auxiliary capacitor (13), a measurement circuit (15, 16, 21) for measuring the charging times of the auxiliary capacitor, and an evaluation logic (18). A quantity describing the energy state of the energy storing device is provided at the output of the evaluation circuit.

13 Claims, 3 Drawing Sheets

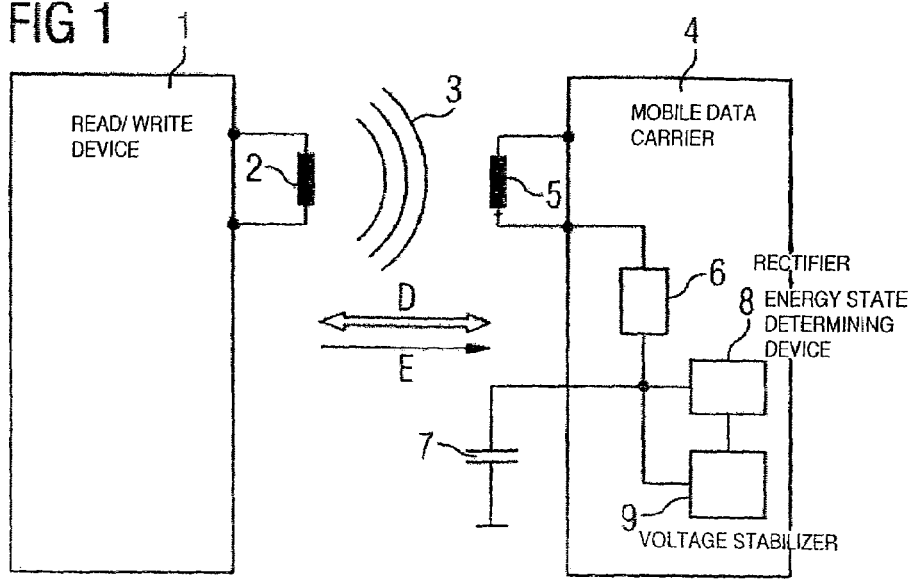
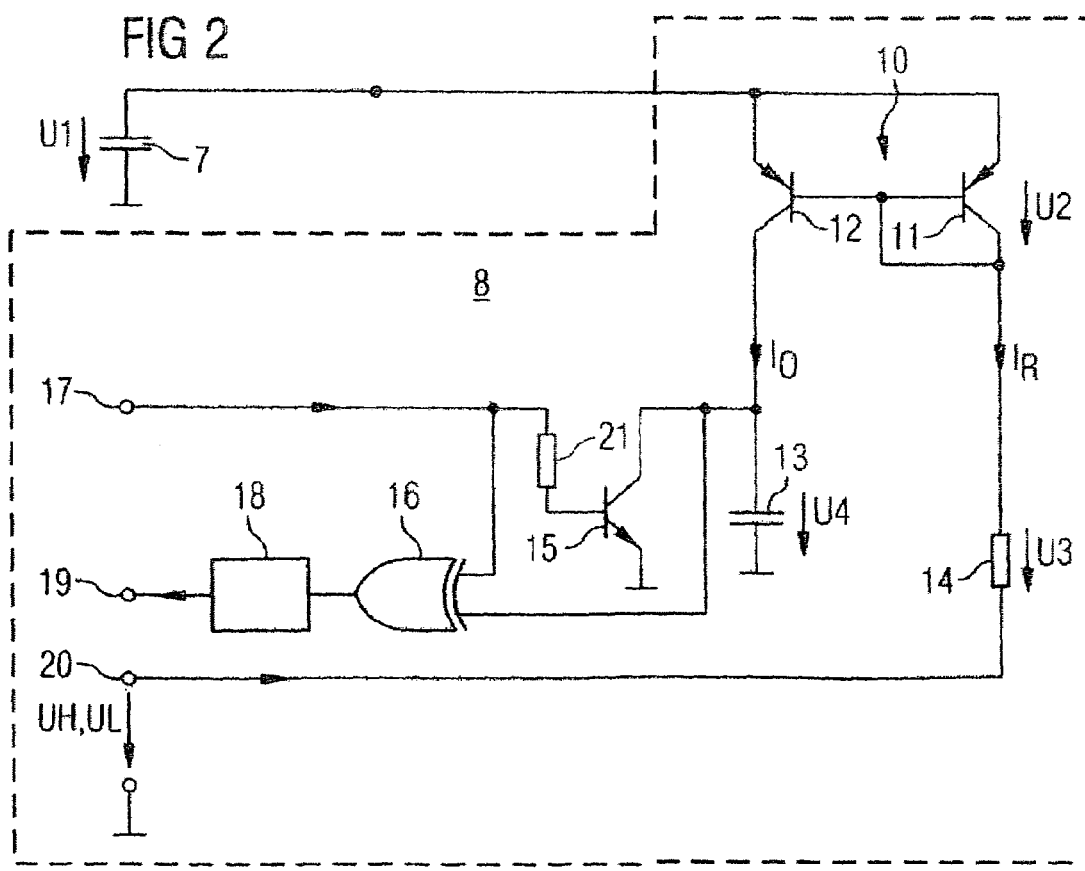

DEVICE FOR DETERMINING THE ENERGY STATE OF AN ENERGY STORING DEVICE OF A MOBILE DATA CARRIER

This is a Continuation of International Application PCT/EP03/12637, with an international filing date of Nov. 6, 2003, published under PCT Article 21(2) in German, and the disclosure of which is incorporated into this application by reference.

FIELD OF AND BACKGROUND OF THE INVENTION

The invention relates to a device for determining the energy state (state of charge) of an energy storing device of a mobile data carrier. Such a device can be used, for example, in connection with contactless identification systems.

Contactless identification systems use contactless transmission techniques, which can be based on electromagnetic transmission or transmission using light, infrared or ultrasound signals. Systems of this type are used, for example, in transportation systems, e.g., to identify persons or goods being moved. The necessary data are transmitted by a transceiver to a data carrier and back again over a contactless data link, e.g., an air interface. This contactless identification method also makes it possible to collect data while the data carrier moves past the transceiver, without the need for the data carrier to be inserted into, or swiped through a read/write device. Data carriers of this type are used, for example, as tickets with an electronically reloadable credit balance, such that the corresponding amount is automatically deducted when the means of transport is used.

German Publication DE 691 23 887 T2 discloses an IC card, which can detect a voltage drop in the built-in battery. For this purpose, the IC card is equipped with a data transceiver, a data processing unit, a charging unit, a comparator and a timer.

German Laid-Open Publication DE 100 54 970 A1 discloses a method for controlling the charging and discharging phases of a backup capacitor. In a circuit configuration, a constant current source is formed by a current-mirror circuit, and a comparator is used to compare the voltage on the backup capacitor with a band gap reference.

To enable the data carriers to be used for an indefinite period of time, the integration of chemical energy storing devices, e.g., batteries, is dispensed with in these units. The electric power required by the data carriers is instead picked up externally without contact, i.e., from a source of energy originating from the transceiver, e.g., an electric or magnetic field. Hence, suitable transmission and coding methods are required for the transceiver to communicate with such data carriers. On the one hand only certain frequency bands are typically released for the transmission of data, e.g., the ISM (Industrial, Scientific & Medical) frequency bands for industrial, scientific and medical applications. Possible national radio regulations may define, among other things, modulation bandwidths and field strengths to be complied with. On the other hand, the transmission and coding methods must also ensure the power supply of the electronics on the data carrier.

Such methods are described in ISO/IEC Standard 15693 Part 2, "Air Interface and Initialization." Methods of this type enable a continuous power supply of the data carrier electronics, which is provided by the energy of the applied carrier frequency of the transceiver. To modulate the data to be transmitted, the carrier frequency is switched off only for a maximum time interval. Within this time interval, an energy storing device previously charged by the electric or magnetic field must be able to supply the power for the data carrier electronics. The temporary energy storing device used on the data carrier is generally a capacitor. The data are coded by switching off the carrier at defined positions within a cyclic time-slot pattern. Taking into account the aforementioned maximum time interval, the standard further defines the field strength limits for the sidebands produced by modulation at a certain carrier frequency. The height of the sideband modulation is determined on the one hand by the time ratio of the switched-on to the switched-off carrier frequency. In addition, further successive switching from the switched-on to the switched-off carrier frequency clearly contributes to the increase in the sideband modulation. The need to comply with the sideband limits defined in the standard leads to a maximum possible data rate.

Data transmission using contactless transmission methods can be undesirably influenced, however, by insufficient coupling. Such insufficient coupling can occur, for example, if a mobile data carrier moves very rapidly through a field or moves along the field boundaries where the energy transfer is low.

This can have drawbacks, for example, if a write process to a read/write memory of a mobile data carrier was started when the coupling between the mobile data carrier and the stationary read/write device was sufficient, but because of a movement of the mobile data carrier relative to the stationary read/write device, the energy storing device of the mobile data carrier cannot be adequately recharged. As a result, the power required for the write process may not be available in the mobile data carrier, so that the write process cannot be correctly completed.

SUMMARY OF THE INVENTION

One object of the invention is to provide a way to obviate the above-described drawbacks.

This and other objects are attained by a device for determining an energy state of an energy storing device of a data carrier, in which a stabilized DC voltage for the supply of the data carrier is derived from an unstabilized DC voltage available at the energy storing device. The device has an evaluation circuit connected to the energy storing device. The evaluation circuit includes an auxiliary capacitor, a measurement circuit, evaluation logic, and a current mirror. The measurement circuit measures charging times of the auxiliary capacitor. The evaluation logic is connected to an output of the measurement circuit, and determines a quantity describing the energy state of the energy storing device from the measured charging times of the auxiliary capacitor. The current mirror is arranged between the energy storing device and the measurement circuit, the current mirror having mutually parallel paths. The auxiliary capacitor, the measurement circuit connected to the auxiliary capacitor, and the evaluation logic are connected to the output of the measurement circuit are arranged in a first path of the mutually parallel paths and an ohmic resistor is provided in a second path of the mutually parallel paths.

As further embodiments and refinements of the invention, the measurement circuit has a measurement time signal input, via which a measurement time signal is supplied to the measurement circuit. The measurement circuit comprises a transistor and an XOR gate, the measurement time signal input being connected to a control input of the transistor and to an input of an XOR gate, wherein the transistor in its conducting state grounds a terminal of the auxiliary capacitor which is remote from ground. The terminal of the auxiliary capacitor remote from ground is connected to a second input of the XOR gate. The ohmic resistor provided in the second path is disposed between the digital signal input and the current mirror.

Preferably, the measurement circuit has a digital signal input via which a HIGH and LOW level signal can be supplied to the measurement circuit. The measurement circuit is configured to measure a first and a second charging time of the auxiliary capacitor. The first charging time is determined when a LOW level signal is present at the digital signal input and the second charging time is determined when a HIGH level signal is present at the digital signal input.

A further embodiment of the invention is a mobile data carrier for the contactless exchange of data with a transceiver. The mobile data carrier includes the device, preferably as described above, for determining an energy state of an energy storing device of the mobile data carrier. The mobile data carrier further comprises the energy storing device, a voltage stabilizer, and transmitting means. The voltage stabilizer derives a stabilized DC voltage from unstabilized DC voltage available at the energy storing device, and supplies the mobile data carrier with the stabilized DC voltage. The transmitting means sends the quantity describing the energy state of the energy storing device output to the transceiver.

A further embodiment of the invention is an identification system including a mobile data carrier, preferably as described above, together with a transceiver. The mobile data carrier is connected to the transceiver via a contactless transmission link.

The particular advantages of the invention are that information regarding the energy state of the mobile data carrier may be provided to the user at any time. This makes it possible to determine when the energy state of the energy storing device of the mobile data carrier is insufficient and to correctly and completely repeat a data exchange that was previously incomplete or faulty because of the insufficient energy state. The means therefor can be realized on the mobile data carrier with little additional complexity. A device according to the invention provides rapid and accurate information on the energy state of the energy storing device of the mobile data carrier. A further advantage of the invention is that the received information is almost completely independent of the tolerances of the involved circuit elements.

BRIEF DESCRIPTION OF THE DRAWINGS

Additional advantageous characteristics of the invention will now be described, by way of example, with reference to the figures.

The figures show:

FIG. 1 is a block diagram depicting components of an identification system that are particularly useful to understand the invention, FIG. 2 is a circuit diagram depicting a device for determining the energy state of an energy storing device of a mobile data carrier.

DETAILED DESCRIPTION OF THE PREFERRED EMBODIMENTS

Figure 3:
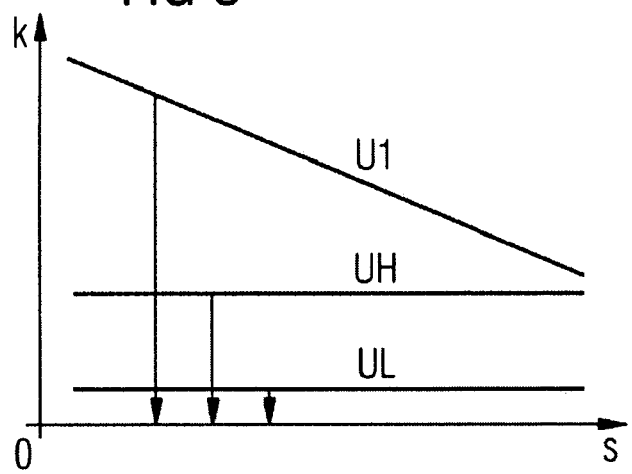
FIG. 3 is a diagram illustrating different voltages.

FIG. 1 shows a block diagram illustrating components of an identification system, to facilitate the understanding of the invention.

The system depicted has a read/write device 1 and a mobile data carrier 4. A bidirectional exchange of data D takes place between the read/write device 1 and the mobile data carrier 4 over an air transmission link 3. The read/write device further transmits energy E to the mobile data carrier 4 over the air transmission link 3. This transmission of energy occurs at time intervals when no data are being exchanged. The transmission of data and energy is based on the principle of inductive coupling. For this purpose, the read/write device 1 is equipped with a coil 2 and the mobile data carrier 4 with a coil 5.

In the mobile data carrier 4, the transmitted energy is supplied to the energy storing device, which is implemented as a capacitor, via a rectifier 6. The unstabilized DC voltage present at the capacitor 7 is supplied to a voltage stabilizer 9. At the output of the voltage stabilizer 9, the stabilized DC voltage required to supply the mobile data carrier 4 is made available.

The capacitor 7 is further connected with a device 8 that is provided for determining the energy state of the capacitor 7.

FIG. 2 is a circuit diagram showing in greater detail the device 8 for determining the energy state of the capacitor 7 of the mobile data carrier 4. The device 8 has a current mirror 10 containing transistors 11 and 12. The current mirror 10 has two mutually parallel paths. In the first path, in which the transistor 12 is located, a current $I_0$ flows. In the second path, in which the transistor 11 is located, a current $I_R$ flows. In the second path, there is also an ohmic resistor 14, which is connected to the transistor 11 and the other terminal of which is connected to a HIGH/LOW level signal input 20 of the device 8. Via this input 20, a logic circuit (not depicted) supplies either a HIGH level signal or a LOW level signal to the device 8.

In the first path, an auxiliary capacitor 13 is connected to the transistor 12 and with its other terminal is connected to ground. The terminal of the auxiliary capacitor 13 remote from the ground is connected to an input of an XOR gate 16 and to the collector of an npn transistor 15. The emitter of the transistor 15 is connected to ground. The base of the transistor 15 is connected to an input 17 of the device 8 via an ohmic resistor 21. The input 17 is a measurement time input, which is used to supply signals defining measurement time intervals to the device 8. These measurement time signals are generated in the aforementioned logic circuit (not shown), which also supplies the signals provided at the HIGH/LOW level signal input 20. This logic circuit has information on the system clock, which is required to generate the signals supplied to the inputs 17 and 20. The measurement time signals present at the input 17 are supplied to the other input of the XOR gate 16 and to the base of the npn transistor 15 via the ohmic resistor 21.

The output signals of the XOR gate 16, which is information regarding the charging times of the auxiliary capacitor 13, are supplied to an evaluation logic 18. The evaluation logic 18 uses the charging times to calculate a quantity in the form of a numerical value, which provides information on the energy state of the capacitor 7. In particular, this numerical value contains information regarding the ratio of the unstabilized supply voltage present at the capacitor 7 to the stabilized DC voltage required as the supply voltage by the mobile data carrier. The latter is, for example, 3 V and is the operating voltage of a chip on the mobile data carrier. The information available at the output of the evaluation logic 18 can be used, in particular, to make a statement as to how large the power reserve of the mobile data carrier is at the time of the measurement.

The mode of operation of the device depicted in FIG. 2 will now be described in greater detail.

In a current mirror, such as the one realized by the transistors 11 and 12 in FIG. 2, the following general relation holds:

$$\frac{I_0}{I_R} = 1 - \frac{2}{\beta + 2} \approx 1$$

Furthermore, for the voltage U of a capacitor C, which is charged with a constant current $I_0$, the following relation holds:

$$U = I_0 \cdot t / C$$

Converting this relation yields:

$$t = U \cdot C / I_0 \quad \text{(Equation 1)}$$

These relations also hold for the charging process of the auxiliary capacitor 13 and are taken into account when the energy state of the capacitor 7 is determined according to the invention.

If according to FIG. 2 the dropping voltage across the capacitor 7 is U1, the dropping voltage across the transistor 11 is U2, the dropping voltage across the resistor 14 is U3 and the voltages provided at the input 20 are UH and UL, respectively, the following holds:

$$U3 = U1 - U2 - UL, \text{ if } UL \text{ is present at the input 20,}$$
and
$$U3 = U1 - U2 - UH, \text{ if } UH \text{ is present at the input 20.}$$

If UL=0, then:

$$U3 = U1 - U2$$

The following relation holds for the current $I_R$ if UH is present at the input 20:

$$I_{R(UH)} = \frac{U3 - UH}{R_{14}}$$

If UL is present at the input 20 the following holds for current $I_R$:

$$I_{R(UL)} = \frac{U3 - UL}{R_{14}}$$

For UL=0:

$$\frac{I_{R(UL)}}{I_{R(UH)}} = \frac{U3}{U3 - UH} \quad \text{(Equation 2)}$$

Consequently, when the quotient of the currents $I_{R(UL)}$ and $I_{R(UH)}$ is formed the value of the resistor 14 is eliminated.

Taking into account equations 1 and 2, the following relations are obtained for the device shown in FIG. 2:

$$t = \frac{C_{13} \cdot U4}{I_0} \quad \text{(Equation 3)}$$

$$I_0 \approx I_R$$

$$t_{UH} = \frac{C_{13} \cdot U_{th}}{I_{R(UH)}}$$

$$t_{UL} = \frac{C_{13} \cdot U_{th}}{I_{R(UL)}}$$

Hence:

$$\frac{t_{UH}}{t_{UL}} = \frac{I_{R(UL)}}{I_{R(UH)}} = \frac{U3}{U3 - UH}$$

$t_{UH}$ and $t_{UL}$ are the charging times of the auxiliary capacitor 13 if this capacitor is charged by the currents $I_{R(UH)}$ or $I_{R(UL)}$ until the voltage threshold value $U_{th}$ is reached at the input of the XOR gate. The assumed input condition was that the auxiliary capacitor 13 is completely discharged via the conducting transistor 15 prior to the start of a measurement process, as will be explained below with reference to FIGS. 6 and 7.

Equation 3 shows that neither the capacitance value of the auxiliary capacitor 13 nor the voltage value of the threshold voltage $U_{th}$ influences this equation. The charging times $t_{UH}$ and $t_{UL}$ are inversely proportional to the charging currents $I_{R(UH)}$ and $I_{R(UL)}$.

The effective application range of equation 3 is the range of UH<<U3 and U3−UH>0.

FIG. 3 is a diagram illustrating various voltages of FIG. 2. The distance S of the read/write device 1 from the mobile data carrier 4 is plotted along the abscissa and the inductive coupling or the coupling factor k along the ordinate. It is clear that the LOW level signal UL and the HIGH level signal UH are each constant, independent of the distance S, and that the voltage U1 present at the capacitor 7 becomes smaller with increasing distance S.

The supply voltage of the mobile data carrier 4 is obtained from the unstabilized voltage U1 present at the capacitor 7 through a stabilization taking place in circuit block 9 of FIG. 1. It is assumed that the following relations hold in the low-load state:

$$UL \approx 0 \text{ V}$$

$$UH \approx U_{CHIP},$$

where $U_{CHIP}$ is the supply voltage of the mobile data carrier 4.

Figure 4:
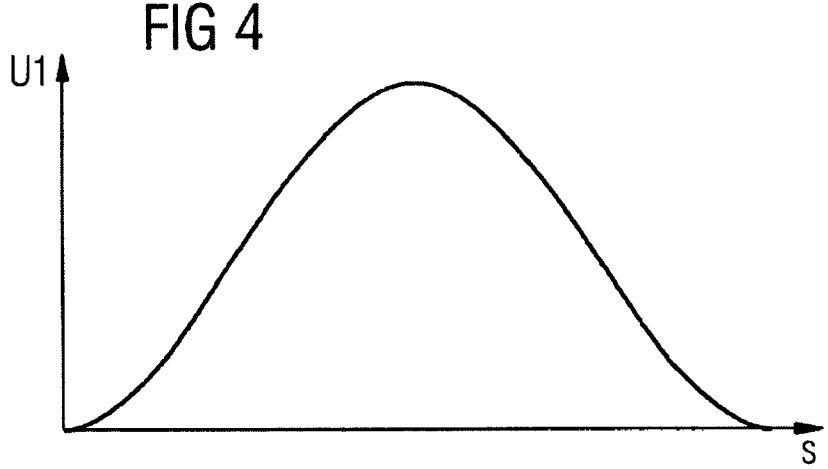
FIG. 4 is a diagram illustrating the voltage curve of the voltage U1 present at the capacitor 7 of FIG. 2 as a function of the distance between the read/write device and the mobile data carrier.

FIG. 4 shows a diagram illustrating the voltage curve of the unstabilized voltage U1 present at the capacitor 7 of FIG. 2 as a function of the distance between the read/write device 1 and the mobile data carrier 4. This bell-shaped voltage curve is present even if the mobile data carrier 4 is moved parallel to the read/write device 1 at a constant distance.

Figure 5:
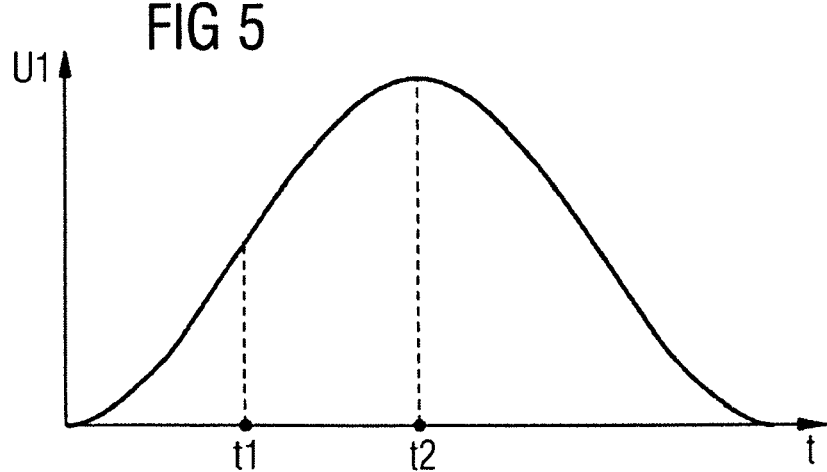
FIG. 5 is a diagram illustrating the position of two measurement instants.

FIG. 5 is a diagram illustrating the position of two measurement instants or measurement time intervals. If the mobile data carrier 4 is moved parallel to the read/write device 1 at a constant distance S, then the voltage U1 at the capacitor 7 has the time characteristic shown, which is bell-shaped. According to the invention, two arbitrary measurement instants or measurement time intervals are determined, such that the voltage value is relatively small at the measurement instant t1 and relatively large at the measurement instant t2. During the time intervals defined by the measurement points, the voltage curve is measured at the auxiliary capacitor 13. As may be seen from FIGS. 6 and 7, different charging times result at the measurement points, making it possible to draw conclusions regarding the energy state of the capacitor 7 of the mobile data carrier 4 and thus also regarding the operability of the mobile data carrier 4.

Figure 6:
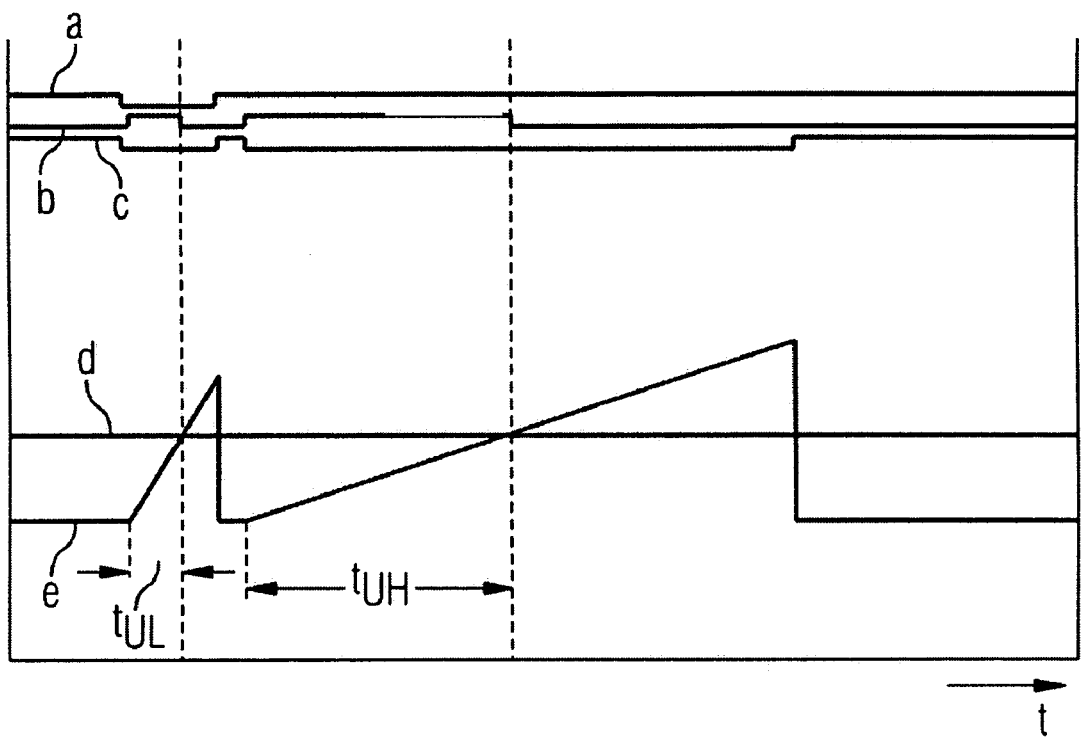
FIG. 6 is a diagram illustrating the charging times measured at the first measurement instant when a relatively small voltage is present at the capacitor 7.

FIG. 6 shows a diagram illustrating the measured charging times as measured at the first measurement instant t1, at which a comparatively small voltage U1 is present at the capacitor 7. The trace (a) of FIG. 6 represents the signal UH or UL applied to the input 20, the trace (b) represents an integration time signal, the trace (c) represents the measurement time signal applied to the input 17, the trace (d) represents the threshold voltage $U_{th}$ and the trace (e) the voltage U4 present at the auxiliary capacitor 13.

The signal UH or UL represented in the trace (a) and the measurement time signal represented in the trace (c) are predefined by the logic circuit (not shown) in which information on the system clock is available. The measurement time signal is started when the signal shown in the trace (a) passes from the HIGH to the LOW state. The integration time interval shown in the trace (b) also starts at this instant. As shown in the trace (e) the charging of the auxiliary capacitor 13 by charging current $I_{0(UL)}$ likewise starts at this instant. The charging process is continued until the voltage at the auxiliary capacitor 13 reaches the threshold voltage $U_{th}$ shown in the trace (d). At this instant—as indicated in the trace (b)—the integration time is terminated and provided to the evaluation logic 18 as charging time $t_{UL}$. After this instant, the measurement time interval is terminated as may be seen from the trace (c). Immediately after the end of the measurement time interval, the auxiliary capacitor 13 is discharged by the transistor 15, which is then conducting.

When the HIGH/LOW level signal shown in the trace (a) is at the HIGH level and the auxiliary capacitor 13 is discharged, a second measurement time interval is started—as indicated by the second falling edge of the measurement time signal depicted in the trace (c). At this instant, a new measurement of the integration time is started as indicated by the second rising edge of the integration time signal depicted in the trace (b). The charging of the auxiliary capacitor 13 by charging current $I_{0(UH)}$ is also started at this instant. The charging process is continued until the voltage at the auxiliary capacitor 13 reaches the threshold voltage $U_{th}$ shown in the trace (d). At this instant—as shown in the trace (b)—the integration time is terminated and provided as the charging time $t_{UH}$ to the evaluation logic 18. If at this instant the measurement time signal returns to the HIGH state, this measurement time interval is likewise terminated and the auxiliary capacitor 13 is discharged via the transistor 15, which is then conducting.

Figure 7:
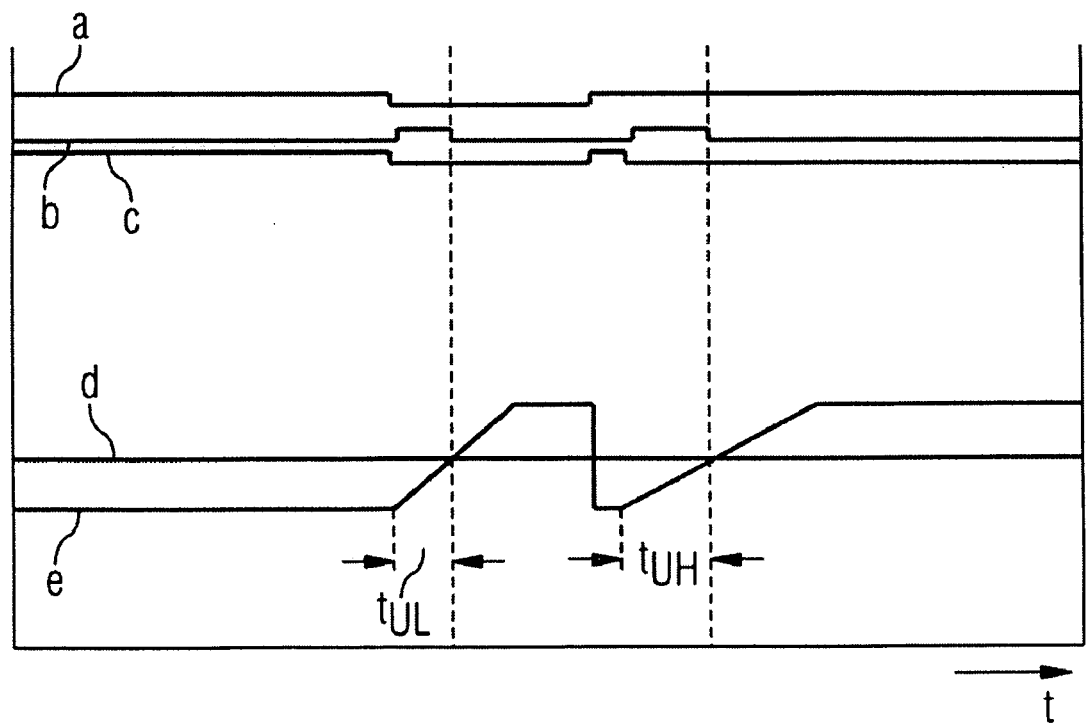
FIG. 7 is a diagram illustrating the charging times as measured at the second measurement instant when a relatively high voltage is present at the capacitor 7.

FIG. 7 shows a diagram illustrating the measured charging times as measured at the second measurement instant t2 at which a relatively large voltage U1 is present across the capacitor 7. The trace (a) of FIG. 7 represents the signal UH or UL applied to the input 20, the trace (b) represents an integration time signal, the trace (c) represents the measurement time signal applied to the input 17, the trace (d) represents the threshold voltage $U_{th}$ and the trace (e) the voltage U4 present across the auxiliary capacitor 13.

The signal UH or UL represented in the trace (a) as well as the measurement time signal represented in the trace (c) are predefined by the logic circuit (not depicted), in which information on the system clock is available. The measurement time signal is started when the signal shown in the trace (a) passes from the HIGH to the LOW state. At this instant, the integration time interval shown in the trace (b) also starts. As shown in the trace (e), the charging of the auxiliary capacitor 13 by the charging current $I_{0(UL)}$ likewise starts at this instant. The charging process is continued until the voltage across the auxiliary capacitor 13 reaches the threshold voltage $U_{th}$ shown in the trace (d). At that instant—as indicated in the trace (b)—the integration time is terminated and provided as charging time $t_{UL}$ to the evaluation logic 18. After this instant, the measurement time interval is terminated, as indicated in the trace (c). Immediately after the end of the measurement time interval, the auxiliary capacitor 13 is discharged through the transistor 15, which is then conducting.

If the HIGH/LOW level signal shown in the trace (a) is at the HIGH level and the auxiliary capacitor 13 is discharged, a second measurement time interval is started—as indicated by the second falling edge of the measurement time signal shown in the trace (c). At this instant, a new measurement of the integration time starts as indicated by the second rising edge of the integration time signal shown in the trace (b). Charging of the auxiliary capacitor 13 by the charging current $I_{0(UH)}$ likewise starts at that instant. The charging process is continued until the voltage at the auxiliary capacitor 13 reaches the threshold voltage $U_{th}$ shown in the trace (d). At this instant—as shown in the trace (b)—the integration time is terminated and provided to the evaluation logic 18 as the charging time $t_{UH}$. If after this instant the measurement time signal returns to the HIGH level, this measurement time interval is likewise terminated and the auxiliary capacitor 13 is discharged via the transistor 15, which is then conducting.

The evaluation logic 18 forms the quotient of the charging times $t_{UL}$ and $t_{UH}$ and provides this quotient as the quantity describing the energy state of the capacitor 7 at the output 19 of the device 8. From there this quantity is supplied to a transmission unit of the mobile data carrier 4 and is transmitted to the read/write device 1 over the air transmission link 3. There it is available for display, by means of which a user can assess the energy state of the capacitor 7 of the mobile data carrier 4 and take suitable measures if required. As an alternative thereto, the quantity describing the energy state of the capacitor 7 transmitted to the read/write device 1 can also be evaluated by an automatic unit in the read/write device 1, which introduces suitable measures automatically if necessary.

The above description of the preferred embodiments has been given by way of example. From the disclosure given, those skilled in the art will not only understand the present invention and its attendant advantages, but will also find apparent various changes and modifications to the structures disclosed. It is sought, therefore, to cover all such changes and modifications as fall within the spirit and scope of the invention, as defined by the appended claims, and equivalents thereof.

What is claimed is:

1. A device for determining an energy state of an energy storing device of a data carrier, in which a stabilized DC voltage for the supply of the data carrier is derived from an unstabilized DC voltage available at the energy storing device, comprising:
- an evaluation circuit connected to the energy storing device, said evaluation circuit comprising:
  - an auxiliary capacitor having a first terminal and a second terminal, said second terminal being connected to ground,
  - a measurement circuit connected to the first terminal of the auxiliary capacitor, measuring charging times of the auxiliary capacitor,
  - an evaluation logic connected to an output of the measurement circuit, the evaluation logic determining a quantity describing the energy state of the energy storing device from the measured charging times of the auxiliary capacitor, and
  - a current mirror arranged between the energy storing device and the measurement circuit, the current mirror having mutually parallel paths, wherein the first terminal of the auxiliary capacitor, the measurement circuit connected to the auxiliary capacitor, and the evaluation logic connected to the output of the measurement circuit are arranged in a first path of the mutually parallel paths and an ohmic resistor is arranged in a second path of the mutually parallel paths.

2. A device as claimed in claim 1, wherein the measurement circuit has a measurement time signal input, via which a measurement time signal is supplied to the measurement circuit.

3. A device as claimed in claim 2, wherein the measurement circuit comprises a transistor and an XOR gate, the measurement time signal input being connected to a control input of the transistor and to an input of an XOR gate, wherein the transistor in its conducting state selectively grounds the first terminal of the auxiliary capacitor.

4. A device as claimed in claim 3, wherein the first terminal of the auxiliary capacitor is connected to a second input of the XOR gate.

5. A device as claimed in claim 1, wherein the measurement circuit has a digital signal input via configured to supply an input signal having a HIGH level-state and a LOW level-state to the measurement circuit.

6. A device as claimed in claim 5, wherein the measurement circuit is
- configured to measure a first charging time and a second charging time of the auxiliary capacitor,
- wherein the first charging time is determined when the signal input via said digital signal input has a LOW level-state, and the second charging time is determined when the signal input via said digital signal input has a HIGH level-state signal.

7. A device as claimed in claim 5, wherein said ohmic resistor arranged in the second path is disposed between the digital signal input and the current mirror.

8. A device as claimed in claim 7, wherein the measurement circuit is configured to measure a first and a second charging time of the auxiliary capacitor,
- wherein the first charging time is determined when a LOW level signal is present at the digital signal input and the second charging time is determined when a HIGH level signal is present at the digital signal input.

9. A mobile data carrier for the contactless exchange of data with a transceiver, the mobile data carrier comprising:
- an energy storing device;
- a voltage stabilizer, deriving a stabilized DC voltage from unstabilized DC voltage available at the energy storing device, and supplying the mobile data carrier with the stabilized DC voltage; and
- a device for determining an energy state of said energy storing device, the device comprising:
  - an evaluation circuit connected to the energy storing device, said evaluation circuit comprising:
    - an auxiliary capacitor,
    - a measurement circuit measuring charging times of the auxiliary capacitor,
    - an evaluation logic connected to an output of the measurement circuit, the evaluation logic determining a quantity describing the energy state of the energy storing device from the measured charging times of the auxiliary capacitor, and
    - a current mirror arranged between the energy storing device and the measurement circuit, the current mirror having mutually parallel paths, wherein the auxiliary capacitor, the measurement circuit connected to the auxiliary capacitor, and the evaluation logic connected to the output of the measurement circuit are arranged in a first path of the mutually parallel paths and an ohmic resistor is arranged in a second path of the mutually parallel paths; and
  - transmitting means for sending the quantity describing the energy state of the energy storing device output to the transceiver.

10. An identification system comprising:
- a transceiver; and
- a mobile data carrier connected to the transceiver via a contactless transmission link, wherein the mobile data carrier comprises:
- an energy storing device;
- a voltage stabilizer, deriving a stabilized DC voltage from unstabilized DC voltage available at the energy storing device, and supplying the mobile data carrier with the stabilized DC voltage; and
- a device for determining an energy state of said energy storing device, the device comprising:
  - an evaluation circuit connected to the energy storing device, said evaluation circuit comprising:
    - an auxiliary capacitor,
    - a measurement circuit measuring charging times of the auxiliary capacitor,
    - an evaluation logic connected to an output of the measurement circuit, the evaluation logic determining a quantity describing the energy state of the energy storing device from the measured charging times of the auxiliary capacitor, and
    - a current mirror arranged between the energy storing device and the measurement circuit, the current mirror having mutually parallel paths, wherein the auxiliary capacitor, the measurement circuit connected to the auxiliary capacitor, and the evaluation logic connected to the output of the measurement circuit are arranged in a first path of the mutually parallel paths and an ohmic resistor is arranged in a second path of the mutually parallel paths; and
  - transmitting means for sending the quantity describing the energy state of the energy storing device output to the transceiver.

11. A device as claimed in claim 1, wherein the current mirror comprises a transistor with an emitter connected to the energy storing device and a collector connected to the first terminal of the auxiliary capacitor.

12. A mobile data carrier as claimed in claim 9, wherein the current mirror comprises a transistor with an emitter connected to the energy storing device and a collector connected to the first terminal of the auxiliary capacitor.

13. An identification system as claimed in claim 10, wherein the current mirror comprises a transistor with an emitter connected to the energy storing device and a collector connected to the first terminal of the auxiliary capacitor.

* * * * *